May 27, 1930.  W. W. DRURY  1,759,979
VARIABLE ELECTRIC CONDENSER
Filed Jan. 9, 1924
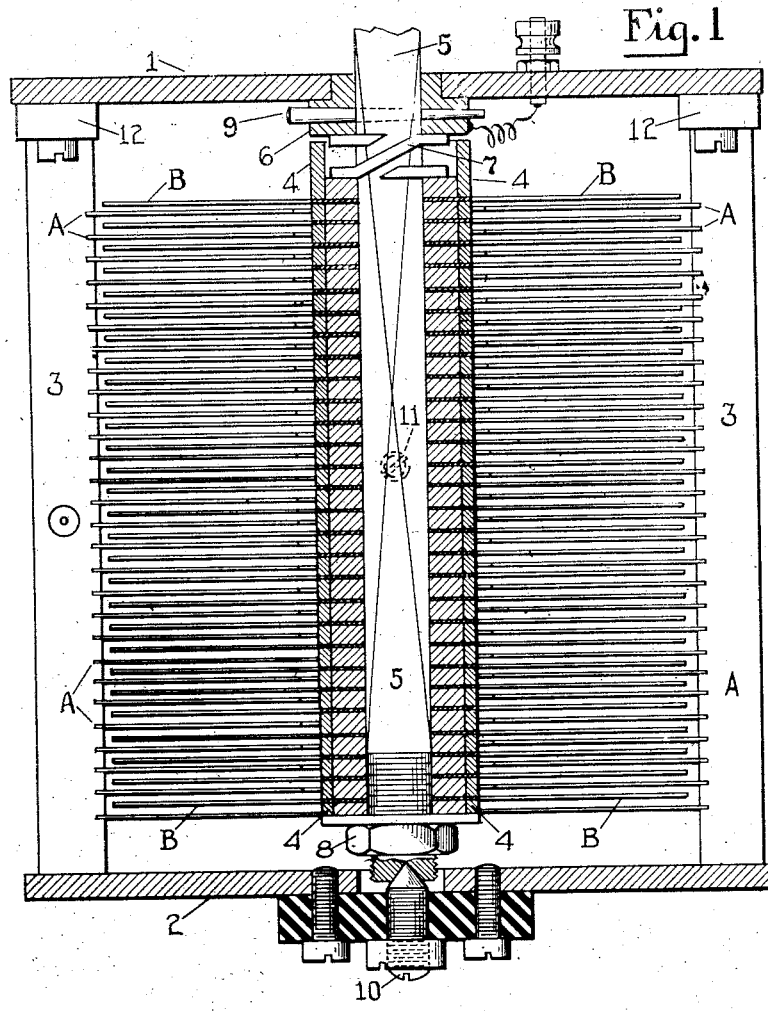
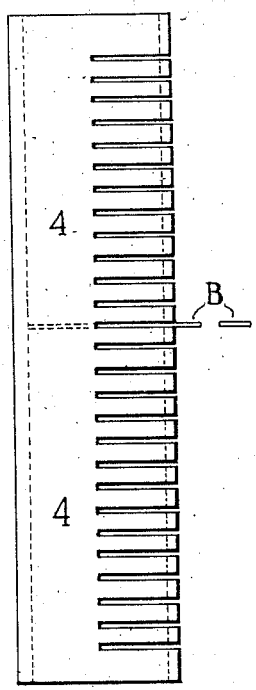
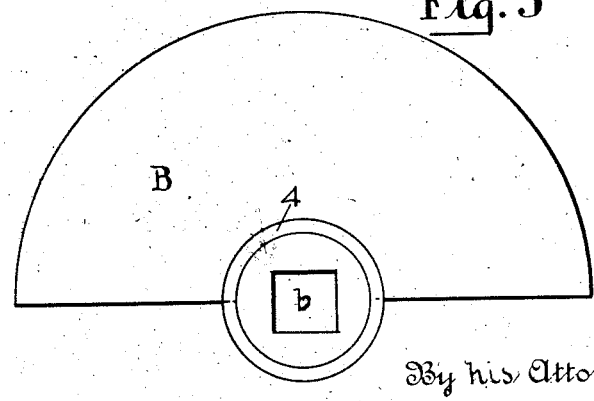
Inventor
WILLIAM W. DRURY
By his Attorney Patented May 27, 1930

1,759,979

UNITED STATES PATENT OFFICE

WILLIAM WALTER DRURY, OF LONDON, ENGLAND, ASSIGNOR TO RADIO CORPORATION OF AMERICA, A CORPORATION OF DELAWARE

VARIABLE ELECTRIC CONDENSER

Application filed January 9, 1924, Serial No. 685,095, and in Great Britain January 12, 1923.

This invention relates to variable electric condensers of the type in which a number of semi-circular plates carried by a central shaft can be turned so as to overlap to varying degrees a number of fixed plates.

In such a condenser it is necessary that the various plates should be accurately adjusted in order that there may be no risk of any of the moving plates coming into contact with any of the fixed plates between which they move, and considerable skill is necessary in assembling the various parts.

By this invention such a condenser can be readily and quickly produced by unskilled labour.

According to this invention a hollow spindle has formed in it, preferably by a bank of saws, a number of transverse slots and into these slots the moving plates are inserted so that they lie accurately at right angles to the axis of the hollow spindle. A mandrel of the same shape as the shaft of the finished instrument is then passed through the hollow spindle and molten metal, such as type metal, is run in and allowed to fill the space between the mandrel and the hollow spindle so that the plates are secured in the hollow spindle. The mandrel is then forced out and the moving plates unit is inserted in place with the moving plates between the fixed plates which are secured in slots in a pillar extending between the top and bottom plates of the instrument.

Preferably there are three slotted pillars, but the fixed plates are soldered into one only of these pillars to allow for expansion and to eliminate any tendency of the plates to buckle.

These pillars connect the end pieces of the instrument.

Into a central hole, say in the front end, is introduced a collar, while between this collar and the hollow spindle is inserted a helical spring or washer. A spindle is then passed through the collar, the washer and the hollow spindle and is secured in the hollow spindle by an adjusting nut. The collar is fixed to the shaft preferably by means of a taper pin. A centre screw, which screws into the bottom plate and acts as the bottom bearing for the shaft, is then adjusted to give sufficient freedom of rotation. By manipulating the adjusting nut already mentioned to compress the helical spring or washer more or less the moving plates unit can be accurately positioned so that the moving plates lie symmetrically between the fixed plates. When this has been done the hollow spindle is secured to the shaft, for instance, by means of a grub screw.

The invention is illustrated by the accompanying drawing Figure 1 of which is a vertical section through a condenser constructed in accordance therewith, while Figures 2 and 3 are fragmentary side and end elevations of the hollow spindle with one moving plate in position therein.

Two plates which may be of brass called the front and rear end plates 1 and 2 serve as a mounting for three brass pillars 3 which have been slotted by means of a bank of saws to receive the non-moving plates A which are soldered into one of the pillars only, to allow for expansion and to eliminate any tendency to buckle. The slotting obviates the use of washers for the purpose of spacing.

Four is a hollow spindle of solid drawn brass slotted by means of a bank of saws through half its diameter, the cuts being of sufficient width just to admit the moving plates B, these being inserted in a jig which ensures that they lie accurately at right angles to the axis of the hollow spindle.

When all are in a position a steel mandrel of the same section as the shaft 5 is inserted through the square holes $b$ in the plates B and is held firmly and accurately along the axis of the hollow spindle.

Molten type metal is now run in and fills the spaces between the plates B and forms a solid core round the mandrel.

The whole unit is allowed to cool and is then withdrawn from the jig. The mandrel is now forced out and the moving plates unit is inserted in its appropriate place with respect to the fixed plates. The brass shaft 5 is then fitted through the end plate 1, a collar 6 and stiff helical spring or washer 7 and then through the moving plates unit and an adjusting nut 8.

The collar 6 is now fixed to the shaft 5 by means of a taper pin 9 or by soldering and the centre screw 10 is adjusted to give sufficient freedom of rotation to the shaft.

It will be seen that if the moving plates are not symmetrically disposed between the fixed plates adjustment of the adjusting nut 8 will alter this and compress the moving plates unit against the washer or spring 7. When the symmetrical disposition is reached the grub-screw or set screw 11 is tightened up, thus securely locking the moving plates unit to the shaft and obviating any possibility of the adjustment being lost.

Electrical connection to the plates B may be made in any suitable manner, for example, by means of a flexible phosphor bronze lead strip soldered to the collar 6 and affixed to the front plate 1. The electrical connection to the fixed plates A may be made through one of the pillars 3 which are insulated from the front plate by means of ebonite plates 12 to which the pillars are secured or in any other suitable manner.

Having described my invention what I claim is:

1. A rotating element of a rotating plate condenser having a hollow spindle to which the plates are attached, a shaft for the spindle and means independent of the means for attaching the plates to the spindle for adjusting the relative axial position between the spindle and shaft said adjusting means including a yieldable member.

2. A rotating plate condenser comprising a stationary element, a rotating element having a hollow spindle to which the plates are attached, end pieces between which the stationary and rotatable plate elements are mounted and means for positioning and supporting the rotating element between the end pieces comprising a shaft passing through the spindle and threaded at one end, a nut co-operating therewith, a spring at the other end of the shaft pressing against the adjacent end of the spindle, said nut and said spring being adapted to cooperate for adjusting the longitudinal position of the plate element on the shaft.

3. A rotating plate condenser comprising a stationary element, a rotating element, said rotating element having a hollow spindle to which the plates are attached, end pieces between which the stationary and rotatable elements are mounted and means for positioning and supporting the rotating plate element between the end pieces comprising a shaft passing through the spindle and threaded at one end, a collar at the other end, a nut co-operating with the threaded end, and a spring around the other end of the shaft disposed between the spindle of the rotating plate element and the collar, said spring and said nut being adapted to cooperate for adjusting the longitudinal position of the rotating element on the shaft.

4. A rotating plate condenser comprising a stationary element, a rotating element, said rotating element having a hollow spindle to which the plates are attached, end pieces between which the stationary and rotatable elements are mounted, a shaft passing through the spindle, means for holding the shaft in fixed longitudinal position with reference to the end pieces, said shaft being threaded at one end, a nut cooperating therewith and a spring on the shaft, said spring and said nut being adapted to cooperate to adjust the longitudinal position of the rotating element on the shaft.

5. A rotating plate condenser comprising a stationary and a rotating element, said rotating element having a hollow spindle to which the plates are attached, end pieces between which the stationary and rotatable elements are mounted, a shaft passing through the hollow spindle, said shaft being threaded at the one end and having a shoulder near the other end, an adjustable center screw cooperating with the end piece adjacent the threaded end of the shaft, a nut cooperating with the threaded end of the shaft and a spring around the shaft and disposed between the nut and the shoulder, said nut and said spring being adapted to cooperate to adjust the longitudinal position of the plate element on the shaft.

6. A rotating plate condenser comprising a stationary and a rotating element, said rotating element having a hollow spindle to which the plates are attached, end pieces between which the stationary and rotatable elements are mounted, a shaft passing through the spindle, an adjustable set screw threaded through one of the ends and cooperating with the shaft to adjust the longitudinal position of the shaft, a collar adapted to be fastened on the other end of the shaft and to be moved against the corresponding end piece by adjustment of the set screw, a spindle carrying the movable elements and slidably mounted on the shaft, said shaft being threaded at one end and having a nut on said threaded end for adjusting the spindle and a spring on the other end of the shaft for pressing the spindle against the nut.

7. In a rotating plate condenser, a stationary element and a rotating element having a hollow spindle to which the plates are attached, a shaft for the spindle, means including a resilient element for adjusting the relative axial position between the spindle and the shaft and means independent of the means for attaching the plates to the spindle to maintain permanently the adjusted position of the spindle and shaft.

8. In a condenser, a group of relatively fixed plates, a second group of plates fixedly mounted to a spindle, a shaft within the spindle for rotating the second group of plates and means, independent of the means for fixing said second group of plates to the spindle, for moving the spindle relative to the shaft, said moving means comprising a movable member and a resilient member abutting the spindle.

9. A condenser comprising a hollow spindle, means for fixing plates thereto, a shaft for rotating the spindle, and means, independent of the means for fixing the plates to the spindle, for adjusting the relative axial position between the spindle and shaft, said adjusting means including a yieldable member.

10. A condenser comprising a hollow spindle, means for fixing plates thereto, a shaft for rotating the spindle, and means, independent of the means for fixing the plates to the spindle for adjusting the relative axial position between the spindle and shaft, said last mentioned adjusting means comprising a nut screwed to the shaft and abutting the hollow spindle and a yieldable member.

11. A condenser comprising a hollow spindle, means for fixing plates thereto, a shaft within the spindle, a pair of supports beyond the spindle for rotatably supporting the shaft, an abutment axially adjustable on the shaft between one of the supports and said spindle abutting against said spindle, and yieldable means between the spindle and other of said supports for pressing said spindle against said abutment.

12. A condenser comprising a hollow spindle, means for fixing rotatable plates thereto, a shaft within the spindle, a pair of supports beyond the spindle for rotatably mounting the shaft, an abutment, axially adjustable on the shaft between one of the supports and said spindle, abutting against said spindle, yieldable means between the spindle and other of said supports for pressing said spindle against said abutment, and means independent of said abutment and said yieldable means for locking said spindle to said shaft.

13. A condenser comprising stationary plates and movable plates, means supporting and rotating the latter comprising relatively movable concentric shafts, means mounted on one of the shafts yieldably abutting the other shaft, and means for moving the latter towards said last mentioned means.

WILLIAM WALTER DRURY.